(12) United States Patent
Howell et al.

(10) Patent No.: US 10,160,530 B1
(45) Date of Patent: Dec. 25, 2018

(54) IN-LINE ROTATING SUPPORT ASSEMBLY FOR EXHAUST NOZZLE

(71) Applicants: W. Scott Howell, Panama City, FL (US); Phillip Gabriel Allen, Panama City, FL (US)

(72) Inventors: W. Scott Howell, Panama City, FL (US); Phillip Gabriel Allen, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 546 days.

(21) Appl. No.: 15/055,253

(22) Filed: Feb. 26, 2016

(51) Int. Cl.
*B63H 20/24* (2006.01)
*F16L 27/02* (2006.01)

(52) U.S. Cl.
CPC ........... *B63H 20/24* (2013.01); *B63H 20/245* (2013.01); *F16L 27/023* (2013.01)

(58) Field of Classification Search
CPC ...... B63H 20/24; B63H 20/245; F16L 27/023
USPC .............................................. 440/89 R, 89 A
See application file for complete search history.

(56) References Cited

U.S. PATENT DOCUMENTS

| | | | | |
|---|---|---|---|---|
| 2,631,048 A * | 3/1953 | Palmer | ................... | F16L 27/023 285/266 |
| 3,206,836 A * | 9/1965 | Schlussler | ............... | B21C 37/29 138/114 |
| 3,848,899 A * | 11/1974 | Smith | ................... | F16L 27/023 285/146.3 |
| 4,299,262 A * | 11/1981 | Andrepont | ............ | B63B 22/025 137/615 |
| 4,586,908 A * | 5/1986 | Schlichthorst | .......... | F01N 13/12 440/89 G |
| 5,853,308 A * | 12/1998 | Nanami | ................ | B63B 35/731 440/89 R |
| 6,010,379 A * | 1/2000 | Baumann | ............... | B63G 13/02 110/203 |
| 6,022,254 A * | 2/2000 | Neisen | ................. | B63H 20/245 181/243 |
| 6,299,496 B1 * | 10/2001 | Griffiths | ................. | B63H 21/32 440/1 |
| 6,551,155 B2 * | 4/2003 | Lecours | ................. | B63H 21/32 114/55.5 |
| 6,659,821 B2 * | 12/2003 | Nakajima | ............. | B63H 11/08 440/89 J |
| 6,783,413 B2 * | 8/2004 | Nakata | ................. | B63H 20/245 440/89 G |
| 7,168,999 B2 * | 1/2007 | Yokoya | .................. | B63H 21/32 440/89 R |
| 9,758,228 B1 * | 9/2017 | Langenfeld | .......... | B63H 20/245 |

(Continued)

*Primary Examiner* — Christopher P Ellis
(74) *Attorney, Agent, or Firm* — James T. Shepherd

(57) ABSTRACT

An exhaust nozzle's rotating support assembly includes a first assembly having a first ring, a shaft coaxial with the first ring, and first spokes rigidly coupling the shaft to the first ring. The rotating support assembly also includes a second assembly having a second ring, a hub coaxial with the second ring, and second spokes rigidly coupling the hub to the second ring. The hub is mounted on the shaft for rotation with respect to the shaft. Bearings are disposed between the shaft and the hub. The first assembly is rigidly coupled to an exhaust exit port of an exhaust manifold, and the second assembly is rigidly coupled to an exhaust entry port of the exhaust nozzle.

18 Claims, 6 Drawing Sheets

(56) References Cited

U.S. PATENT DOCUMENTS

| | | | |
|---|---|---|---|
| 2005/0215133 A1* | 9/2005 | Abdel-Maksoud | B63G 13/00 440/89 R |
| 2008/0242164 A1* | 10/2008 | McKinney | B63H 21/32 440/89 R |
| 2009/0021006 A1* | 1/2009 | Hobbs | F16L 27/023 285/276 |
| 2009/0117789 A1* | 5/2009 | Rui | B63H 11/08 440/38 |
| 2009/0270000 A1* | 10/2009 | Eichinger | B63H 21/32 440/89 R |
| 2016/0061368 A1* | 3/2016 | Carlberg | F16L 27/023 285/146.1 |

\* cited by examiner

IN-LINE ROTATING SUPPORT ASSEMBLY FOR EXHAUST NOZZLE

ORIGIN OF THE INVENTION

The invention described herein may be manufactured and used by or for the Government of the United States of America for Governmental purposes without payment of any royalties.

FIELD OF THE INVENTION

The invention relates generally to rotating supports, and more particularly to a rotating support assembly that can be placed in-line between a stationary exhaust port and an exhaust nozzle that is to be rotatably coupled to the exhaust port.

BACKGROUND OF THE INVENTION

The U.S. Navy utilizes a variety of amphibious watercraft, some of which include exhaust thruster assemblies for directing exhaust gases into the ambient air to provide the watercraft's propulsion and steering forces. In general, each thruster assembly includes an exhaust manifold and an exhaust nozzle. The exhaust manifold defines an exhaust exit port through which exhaust products (i.e., air generated by the watercraft's lift fans, water spray, small debris, etc.) exit the manifold. The exhaust nozzle defines an exhaust entry port that aligns with the manifold's exhaust exit port. Exhaust products exiting the manifold enter the nozzle through its exhaust entry port. The nozzle is rotatingly coupled to the manifold at the interface between the manifold's exhaust exit port and the nozzle's exhaust entry port.

A bearing assembly is disposed between the manifold's exhaust exit port and the nozzle's exhaust entry port to support. rotation of the nozzle relative to the manifold. The current bearing assembly is arrangement of ring-shaped ball bearing supports and seals located at the periphery of the manifold's exhaust exit port and the nozzle's exhaust entry port. The current bearing assembly has a short useful life and high failure rate for a variety of reasons to include galvanic mismatch of materials and the large bearing area necessitated by large diameter port-to-port interface (e.g., 55 inch diameter port-to-port interface on the Navy's LCAC watercraft).

SUMMARY OF THE INVENTION

Accordingly, it is an object of the present invention to provide a rotating support assembly.

Another object of the present invention is to provide a rotating support assembly that can be placed in-line between a stationary manifold exhaust port and a rotatable exhaust nozzle of an exhaust thruster assembly.

Other objects and advantages of the present invention will become more obvious hereinafter in the specification and drawings.

In accordance with the. present invention, a rotating support assembly includes a first assembly having a first ring, a shaft coaxial with the first ring, and a plurality of first spokes rigidly coupling the shaft to the first ring. The rotating support assembly also includes a second assembly having a second ring, a hub coaxial with the second ring, and a plurality of second spokes rigidly coupling the hub to the second ring. The hub is mounted on the shaft for rotation. with respect to the shaft. Bearings are disposed between the shaft and the hub. In one embodiment, the first assembly is rigidly coupled to an exhaust exit port of an exhaust manifold, and the second assembly is rigidly coupled to an exhaust entry port of an exhaust nozzle thereby allowing the exhaust nozzle to be rotatable with respect to the exhaust manifold.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

The present invention is rotating support assembly that includes a stationary portion and a rotating portion. The stationary portion is shown in isolation in FIGS. 1 and 2, and the entire rotating support assembly is shown incorporated into an exhaust thruster assembly in FIG. 6.

Figure 1:
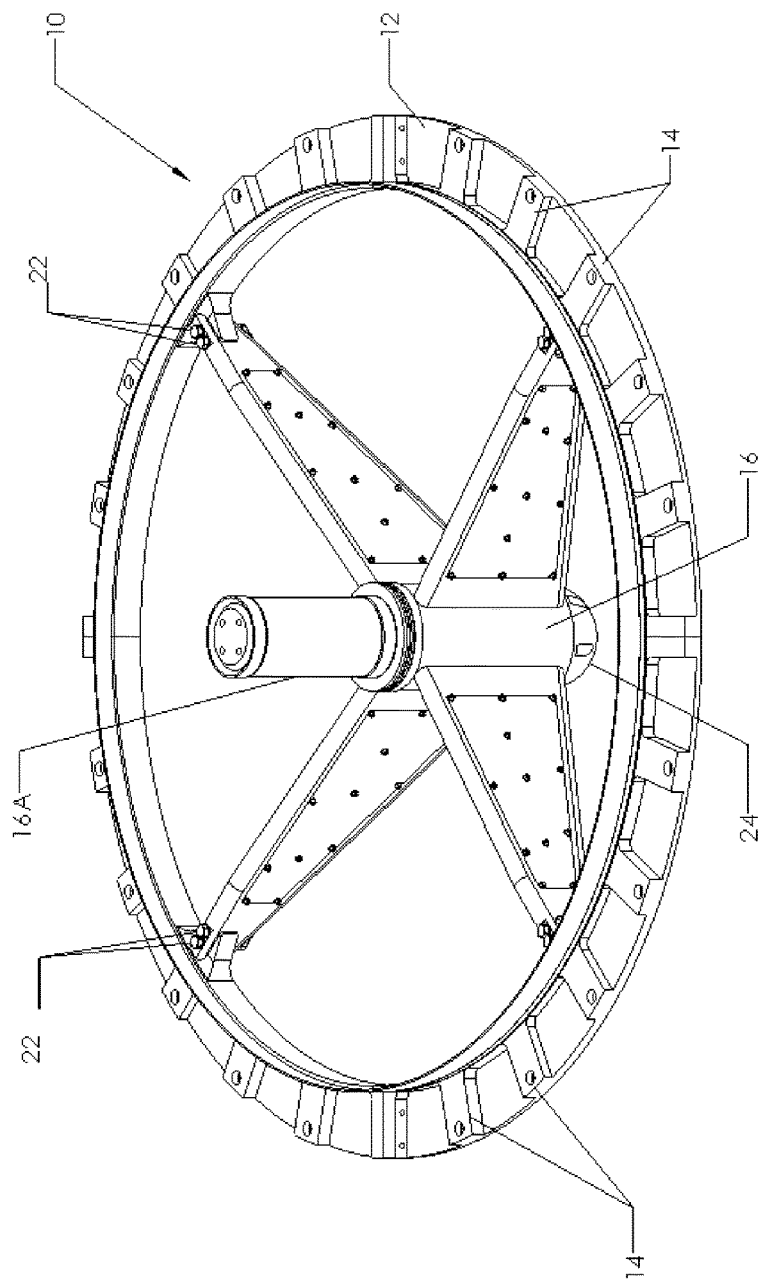
FIG. 1 is a perspective view of the stationary portion of a rotating support assembly in accordance with an embodiment of the present invention.
Figure 2:
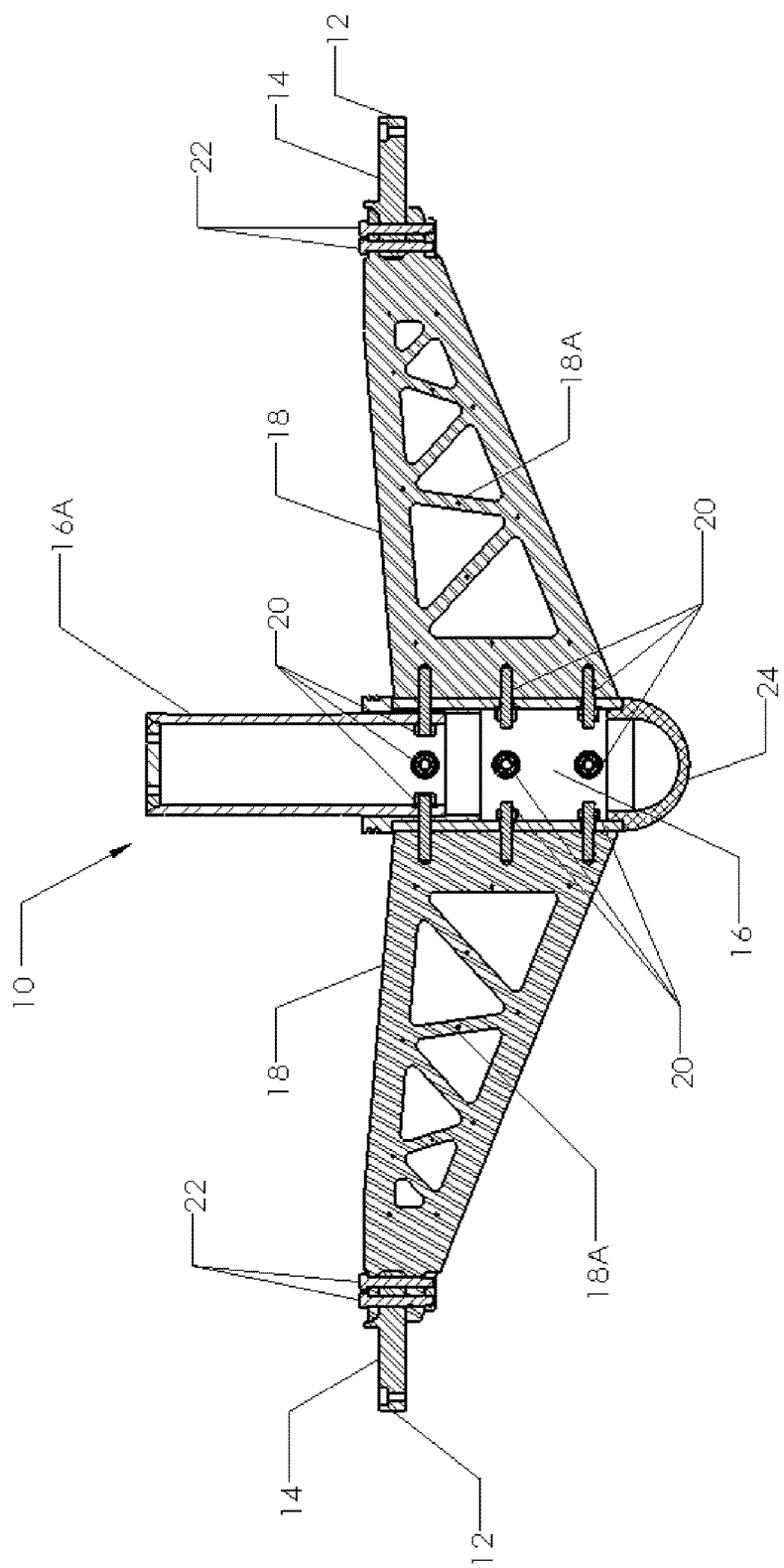
FIG. 2 is a cross-sectional view of the stationary portion of the rotating support assembly shown in FIG. 1.

Referring now to the drawings and. more particularly to FIGS. 1 and 2, the stationary portion of a rotating support assembly in accordance with a. embodiment of the present invention is shown and is referenced generally by numeral 10. Stationary portion 10 is a rigid assembly that includes a ring 12 having mounting bosses 14 distributed about the periphery of ring 12. As will be explained further below, mounting bosses 14 are used when rigidly coupling stationary portion 10 to the exhaust exit port of an exhaust thruster assembly's manifold (not shown in FIGS. 1 and 2).

Figure 3:
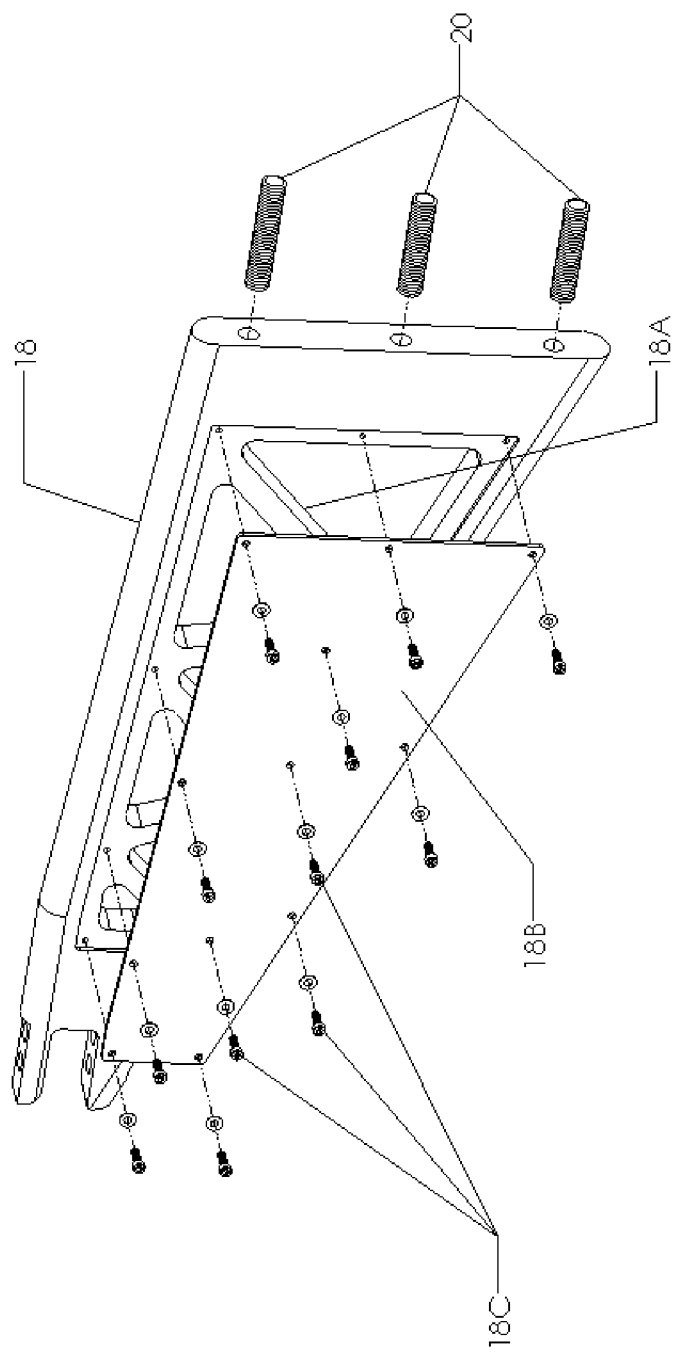
FIG. 3 is an exploded perspective view of a single spoke used in the stationary portion of the rotating support assembly.

Coaxial with ring 12 is a shaft 16 that includes a portion 16A extending axially away from ring 12. Shaft 16 is coupled to ring 12 by a plurality of spokes 18. In the illustrated embodiment, four spokes 18 are evenly distributed (i.e., at 90° intervals) between shaft 16 and ring 12. Each spoke 18 can be coupled to or integrated with shaft 16 and ring 12. For example, in the illustrated embodiment, fasteners 20 couple each spoke 18 to shaft 16 and fasteners 22 couple each spoke 18 to ring 12. An end cap 24 can be used to prevent water from entering shaft 16. As shown in FIG. 3, each spoke 18 can include a truss frame 18A whose open framework is covered by a plate 18B attached to truss frame 18A using fasteners 18C. Although only one plate 18B is shown, a second such plate can also be attached to the opposing side of truss frame 18A without departing from the scope of the present invention.

Figure 4:
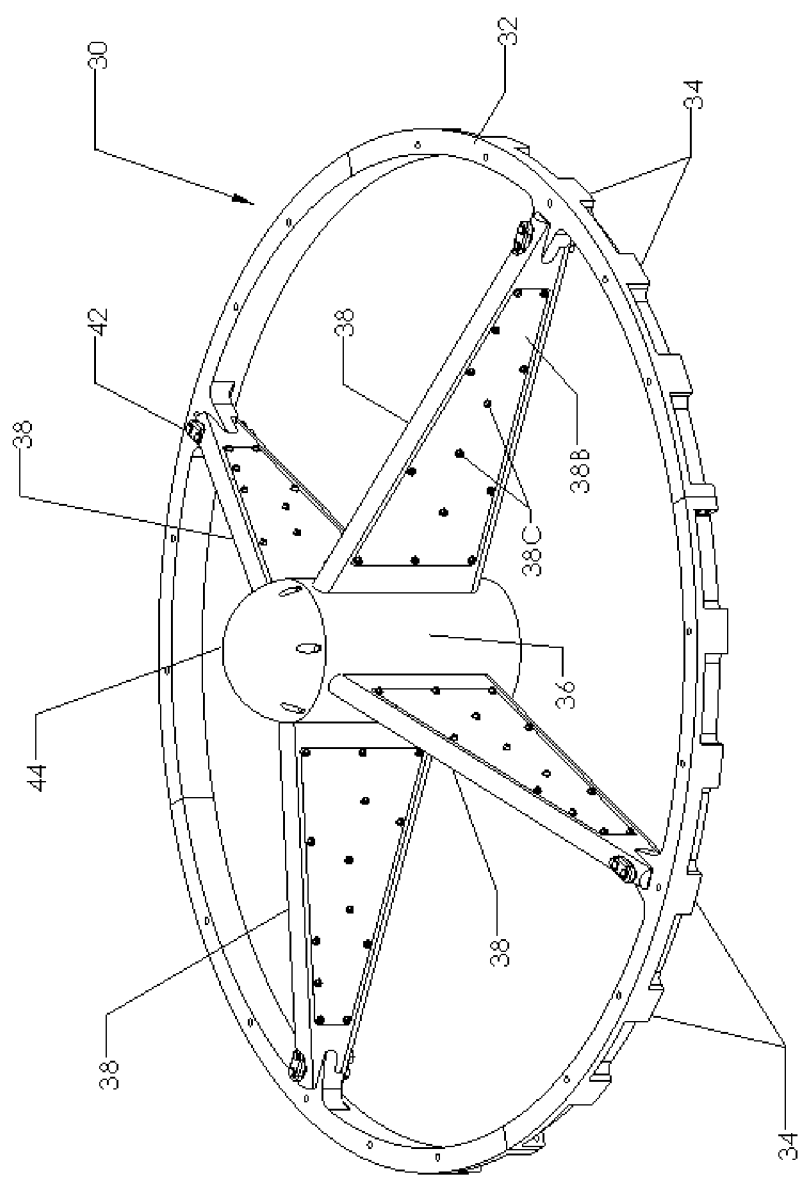
FIG. 4 is a perspective view of the rotating portion of the rotating support assembly in accordance with an embodiment of the present invention.
Figure 5:
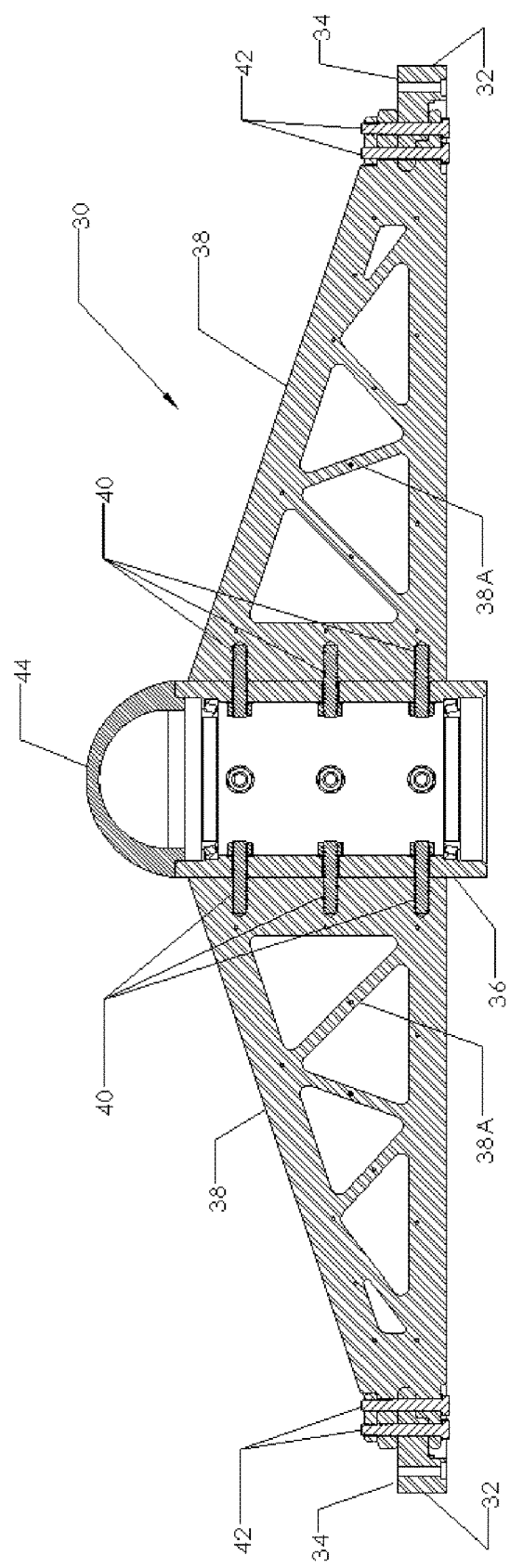
FIG. 5 is a cross-sectional view of the rotating portion of the, rotating support assembly shown in FIG. 4.

Referring now to FIGS. 4 and 5, the rotating portion of a rotating support assembly in accordance with an embodiment of the present invention is shown and is referenced generally by numeral 30. Rotating portion 30 is a rigid assembly that includes a ring 32 having mounting bosses 34 distributed about the periphery of ring 32. As will be explained further below, mounting bosses 34 are used when rigidly coupling rotating portion 30 to the exhaust entry port of an exhaust thruster assembly's nozzle (not shown in FIGS. 3 and 4).

Coaxial with ring 32 is a hub 36 that is coupled to ring 32 by a plurality of spokes 38. In the illustrated embodiment, four spokes 38 are evenly distributed (i.e., at 90° intervals) between hub 36 and ring 32. Each spoke 38 can be coupled to or integrated with hub 36 and ring 32. For example, in the illustrated embodiment, fasteners 40 couple each spoke 38 to hub 36 and fasteners 42 couple each spoke 38 ring 32. An end cap 44 can be used to prevent water from entering hub 36. Each spoke 38 can be constructed in a similar fashion to previously-described spoke 18. That is, each spoke 38 can include a truss frame 38A whose open framework is covered by a plate 38B using fasteners 38C.

Figure 6:
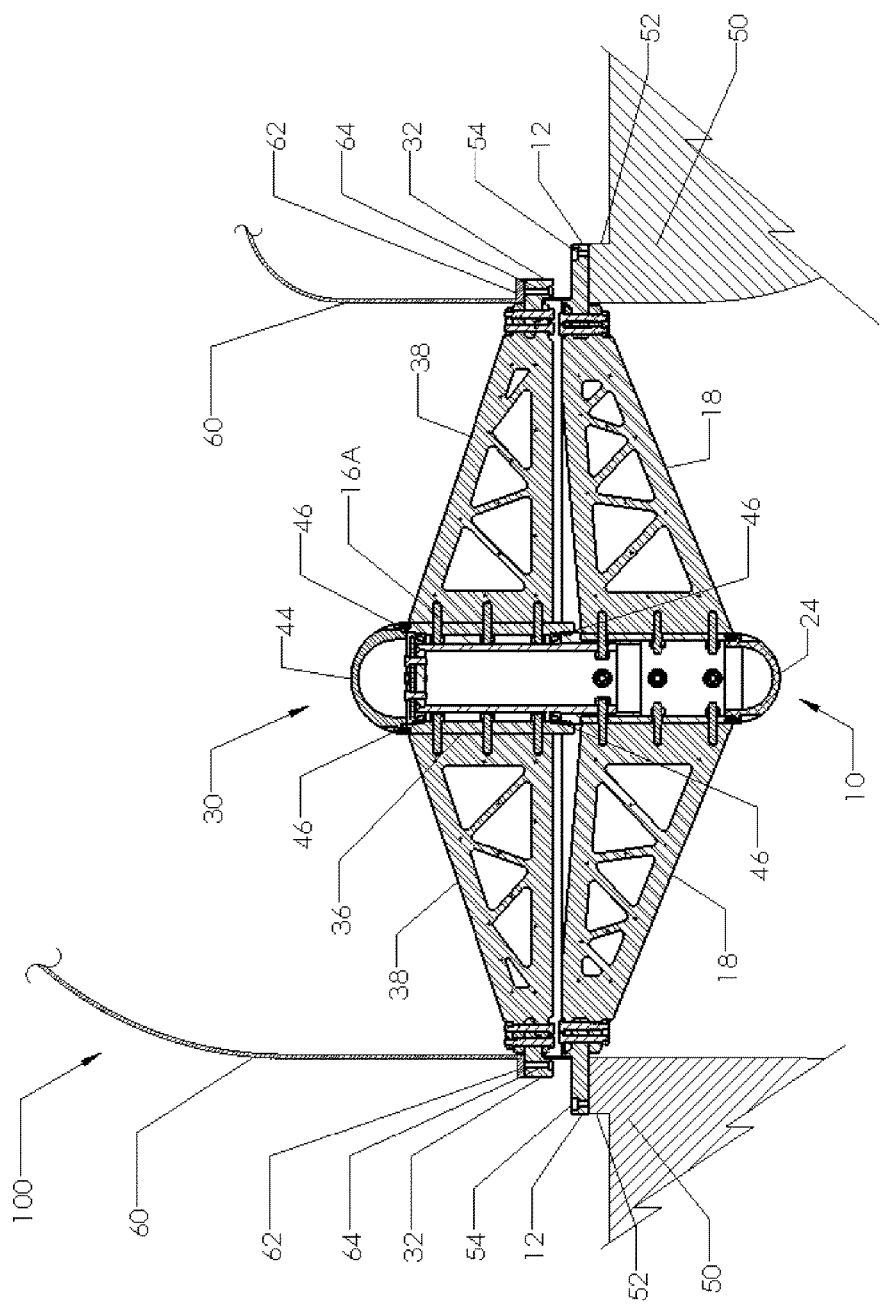
FIG. 6 is cross-sectional view of the rotating support assembly forming a portion of an exhaust thruster assembly in accordance with an embodiment of the present invention.

Referring now to FIG. 6, the rotating support assembly in accordance with an embodiment of the present invention is shown in its assembled form and is incorporated into an exhaust thruster assembly referenced generally by numeral 100. More specifically, hub 36 is mounted on axially-extending portion 16A of shaft 16 with hub 36 being sized for rotation about shaft 16. A plurality of bearings 46 are positioned between shaft portion 16A and hub 36. For example, each of bearings 46 can be a tapered roller bearing (e.g., a Timken taper roller bearing assembly) owing to their ability to withstand large radial and axial forces. E variety of seals (e.g., o-ring seals) can be used to prevent water intrusion between hub 36 and shaft 16.

Ring 12 of stationary portion 10 is rigidly coupled to an exhaust exit port 52 of an exhaust manifold 50 (shown in relevant portion only) using, for example, fasteners 54. Ring 32 of rotating portion 30 is rigidly coupled to an exhaust entry port 62 of an exhaust nozzle 60 (shown in relevant portion only) using, for example, fasteners 64.

The advantages of the present invention are numerous. The in-line rotating support assembly provides for the rotational coupling of large diameter flow regions while greatly reducing the bearing region. This is important when the assembly will be exposed to harsh climates and salt water enviornments.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A rotating support assembly configured to be arranged within an exhaust assembly of a watercraft, comprising:
    a first assembly having a first ring, a shaft coaxial with said first ring, and a plurality of first spokes rigidly coupling said shaft to said first ring;
    a second assembly having a second ring, a hub coaxial with said second ring, and a plurality of second spokes rigidly coupling said hub to said second ring;
    said hub mounted on said shaft for rotation with respect to said shaft; and
    a plurality of bearings disposed between said shaft and said hub.

2. A rotating support assembly as in claim 1, wherein said first ring aligns with said second ring when said hub is mounted on said shaft.

3. A rotating support assembly as in claim 1, wherein each of said first spokes and said second spokes includes a truss.

4. A rotating support assembly as in claim 1, wherein each of said bearings comprises a taper roller bearing.

5. A rotating support assembly as in claim 1, wherein said plurality of first spokes comprises four first spokes.

6. A rotating support assembly as in claim 1, wherein said plurality of second spokes comprises four second spokes.

7. A rotating support assembly configured to be arranged with an exhaust assembly of a watercraft, comprising:
    a first assembly having a first mounting ring, a shaft coaxial with said first mounting ring and having a portion thereof extending axially from said first mounting ring, and a plurality of first spokes rigidly coupling said shaft to said first mounting ring;
    a second assembly having a second mounting ring, a hub coaxial with said second mounting ring, and a plurality of second spokes rigidly coupling said hub to said second mounting ring;
    said hub mounted on said shaft for rotation with respect to said shaft wherein said second mounting ring is rotatable with respect to said first mounting ring; and
    a plurality of bearings disposed between said shaft and said hub.

8. A rotating support assembly as in claim 7, wherein said first mounting ring aligns with said second mounting ring when said hub is mounted on said shaft.

9. A rotating support assembly as in claim 7, wherein each of said first spokes and said second spokes includes a truss.

10. A rotating support assembly as in claim 7, wherein each of said bearings comprises a taper roller bearing.

11. A rotating support assembly as in claim 7, wherein said plurality of first spokes comprises four first spokes.

12. A rotating support assembly as in claim 7, wherein said plurality of second spokes comprises four second spokes.

13. An exhaust thruster assembly configured to be arranged with an engine of a watercraft, comprising:
    an exhaust manifold defining an exhaust exit port;
    a first assembly having a first mounting ring rigidly coupling to said exhaust manifold at said exhaust exit port, a shaft coaxial with said first mounting ring and having a portion thereof extending axially from said first mounting ring, and a plurality of first spokes rigidly coupling said shaft to said first mounting ring;
    an exhaust nozzle defining an exhaust entry port;
    a second assembly having a second mounting ring rigidly coupled to said exhaust nozzle at said exhaust entry port, a hub coaxial with said second mounting ring, and a plurality of second spokes rigidly coupling said hub to said second mounting ring;
    said hub mounted on said shaft for rotation with respect to said shaft wherein said exhaust nozzle is rotatable with respect to said exhaust manifold; and
    a plurality of bearings disposed between said shaft and said hub.

14. An exhaust thruster assembly as in claim 13, wherein said first mounting ring aligns with said second mounting ring when said hub is mounted on said shaft.

15. An exhaust thruster assembly as in claim 13, wherein each of said first spokes and said second pokes includes a truss.

16. An exhaust thruster assembly as in claim 13, wherein each of said bearings comprises a taper roller bearing.

17. An exhaust thruster assembly as in claim 13, wherein said plurality of first spokes comprises four first spokes.

18. An exhaust assembly as in claim 13, wherein said plurality of second spokes comprises four second spokes.

\* \* \* \* \*